United States Patent
Scherer et al.

(10) Patent No.: US 7,755,620 B2
(45) Date of Patent: Jul. 13, 2010

(54) METHOD AND SYSTEM FOR MANIPULATING A DIGITAL REPRESENTATION OF A THREE-DIMENSIONAL OBJECT

(75) Inventors: Ronny Scherer, Vejle O (DK); Olga Timcenko, Billund (DK); Naomi Clark, New York, NY (US); Peter Acker, Seattle, WA (US)

(73) Assignee: Interlego AG, Baar (CH)

( * ) Notice: Subject to any disclaimer, the term of this patent is extended or adjusted under 35 U.S.C. 154(b) by 285 days.

(21) Appl. No.: 10/556,745

(22) PCT Filed: May 13, 2004

(86) PCT No.: PCT/DK2004/000341

§ 371 (c)(1),
(2), (4) Date: Nov. 20, 2006

(87) PCT Pub. No.: WO2004/104811

PCT Pub. Date: Dec. 2, 2004

(65) Prior Publication Data

US 2007/0063997 A1    Mar. 22, 2007

(30) Foreign Application Priority Data

May 20, 2003  (DK) ............................... 2003 00759

(51) Int. Cl.
*G06F 3/033* (2006.01)
*G06F 19/00* (2006.01)
*G06T 15/00* (2006.01)
*G06T 17/00* (2006.01)
*G06G 7/48* (2006.01)

(52) U.S. Cl. ....................... 345/420; 345/419; 345/157; 700/97; 700/98; 703/6; 703/7

(58) Field of Classification Search ......... 345/419–420, 345/157, 651–652; 700/97–98; 703/6–7
See application file for complete search history.

(56) References Cited

U.S. PATENT DOCUMENTS 5,463,722 A * 10/1995 Venolia ....................... 345/662

(Continued)

FOREIGN PATENT DOCUMENTS

EP    1 047 017 A2    10/2000

(Continued)

*Primary Examiner*—Xiao M Wu
*Assistant Examiner*—Tize Ma
(74) *Attorney, Agent, or Firm*—Day Pitney LLP

(57) ABSTRACT

A method of manipulating a three-dimensional virtual building block model by means of two-dimensional cursor movements, the virtual building block model including a plurality of virtual building blocks each including a number of connection elements for connecting the virtual building block with another virtual building block according to a set of connection rules, the method comprising positioning by means of cursor movements in a computer display area representing a two-dimensional projection of said model, a two-dimensional projection of a first virtual building block to be connected to the structure, resulting in a two-dimensional position; determining, from the two-dimensional position, a number of three-dimensional candidate positions of the first virtual building block in the three-dimensional coordinate system; selecting one of said candidate positions based on the connection rules and a predetermined set of position rating rules; and connecting the first building block to said structure at the selected candidate position.

14 Claims, 10 Drawing Sheets

U.S. PATENT DOCUMENTS

| | | |
|---|---|---|
| 5,694,142 A | 12/1997 | Dumoulin et al. |
| 6,389,375 B1 * | 5/2002 | Thomsen et al. ................ 703/2 |
| 6,426,745 B1 | 7/2002 | Isaacs et al. |
| 6,438,922 B1 | 8/2002 | DeLeFevre |
| 6,629,065 B1 * | 9/2003 | Gadh et al. .................... 703/1 |
| 2002/0196250 A1 * | 12/2002 | Anderson et al. ........... 345/420 |

FOREIGN PATENT DOCUMENTS

| | | |
|---|---|---|
| WO | WO 00/43959 | 7/2000 |
| WO | WO 2004/034333 A1 | 4/2004 |

* cited by examiner

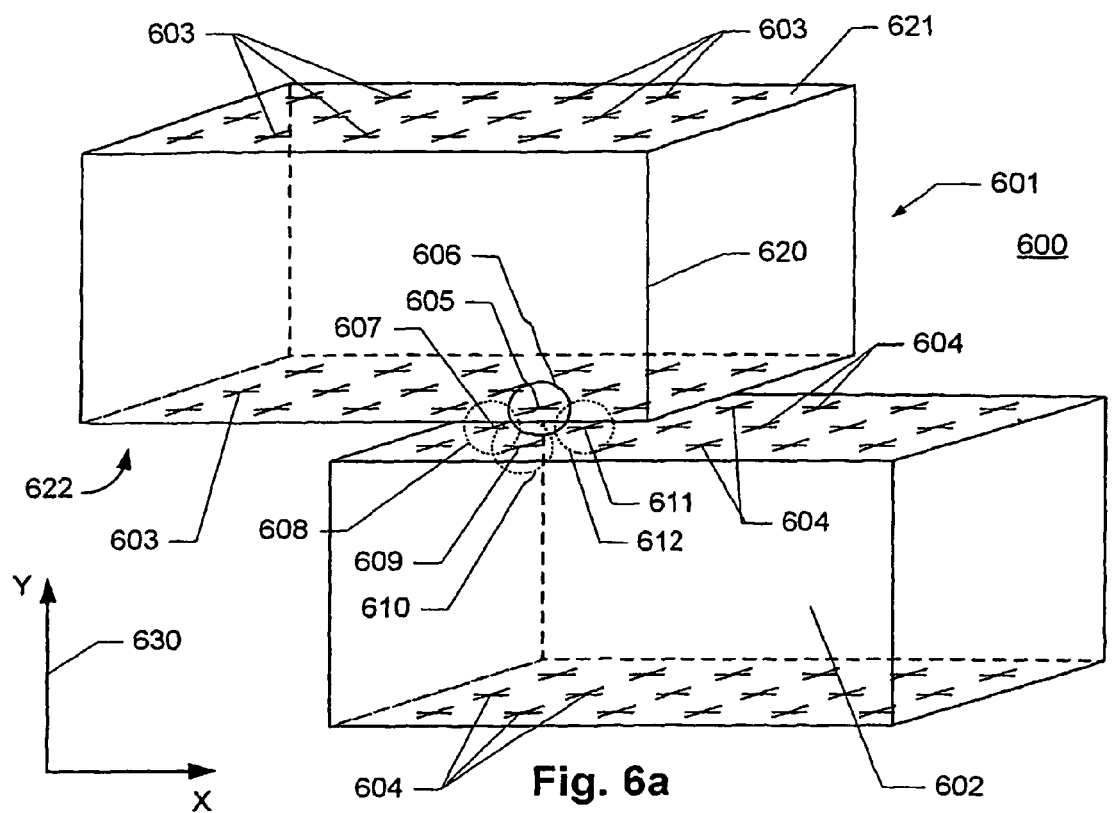
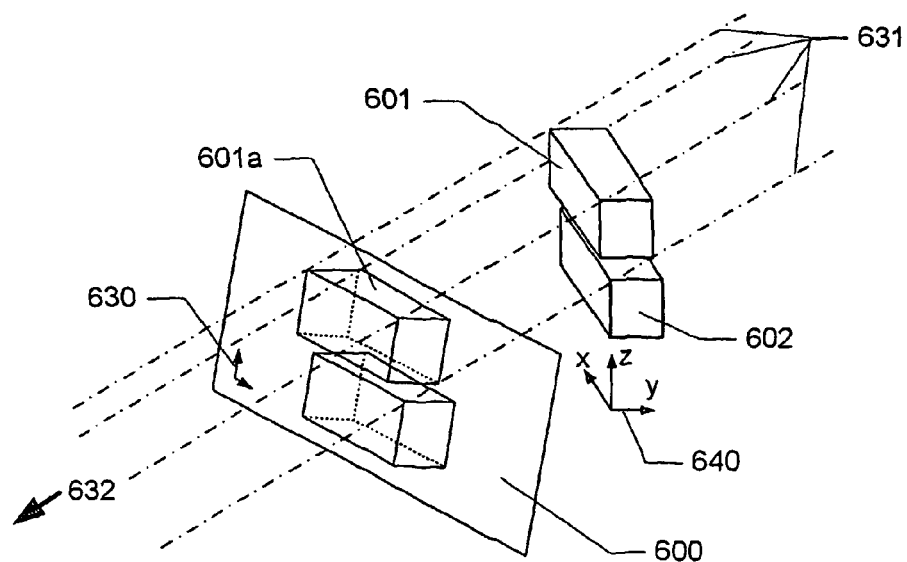

METHOD AND SYSTEM FOR MANIPULATING A DIGITAL REPRESENTATION OF A THREE-DIMENSIONAL OBJECT

FIELD OF THE INVENTION

The invention relates to the manipulation of a digital representation of a three-dimensional object. More particularly, the invention relates to the computer-implemented manipulation of a three-dimensional virtual building block model by means of two-dimensional cursor movements, the virtual building block model including a plurality of virtual building blocks each including a number of connection elements for connecting the virtual building block with another virtual building block according to a set of connection rules.

BACKGROUND OF THE INVENTION

Computer aided modelling of a virtual reality is the task of creating a model of a physical object, manipulating the model, and otherwise handling a model of a physical object in a computer system.

From a first point of view, modelling of a virtual reality is an interesting topic in that it makes it possible to visualise ideas before they are actually implemented in the real world. If the virtual reality model is sufficiently easy to modify, much time can be saved in the process of developing and refining a physical object compared to a situation where the same process should have been carried out in the real world. A simple task of painting an object in the real world may easily take several hours, whereas the computer can apply a new colour to a model within milliseconds or seconds.

From a second point of view, modelling of a virtual reality is interesting in that it makes it possible to create a model of an object that exists in the real world and, via a computer, to visualise and manipulate the model. Thus the model of the object can be stored for different purposes, e.g. for advanced documentation purposes.

Although there exists a huge amount of possible applications for computer aided virtual reality modelling, a special application is to use virtual reality modelling for entertainment or education.

Various types of modelling concepts of physical construction toy sets are known as such. Especially, concepts using modular or semi-modular concepts are very popular. Typically, these concepts provide a set of pre-manufactured elements that can be interconnected with each other in some predetermined way according to modules of the pre-manufactured elements. An example of such a construction toy set is a set of plastic toy building elements available under the name LEGO.

When manipulating representations of three-dimensional (3D) objects or scenes on a computer it is a general problem that a positioning, selection or movement of an object in 3D is performed by means of an input device operating in two dimensions, e.g. the two-dimensional (2D) movements of a computer mouse on a mouse pad. Furthermore, the display area of a computer is two-dimensional as well. In particular, every selected position on the 2D display area of the computer screen corresponds to a plurality of positions in the 3D space having a projection onto the 2D display area corresponding to the selected 2D position. It is a problem to determine one of the positions that is likely to correspond to the user's intention.

Even though considerable efforts have been made to develop computer interface devices that are more suitable for manipulating objects in a 3D computer-graphics, such tools are not yet widely used, in particular not in connection with computer systems used for home entertainment, education, etc.

Known construction games where virtual building blocks are positioned are typically restricted in terms of the degrees of freedom of the movements and rotations of the objects or of the ways of connecting them with other objects.

U.S. Pat. No. 6,426,745 describes a method of manipulating a 3D graphics object with a mouse where a movement in 3D is performed by restricting the movement to one plane or one direction at a time, thereby performing the 3D movement as a sequence of restricted movements, e.g. as a sequence of movements in the x-direction, than the y-direction and finally in the z-direction of a 3D coordinate system.

It is a problem of the above prior art systems that the placement of building blocks in a 3D scene and their connection to a 3D structure with conventional user interfaces is a cumbersome process which requires a high level of skill and training. In particular in the context of entertainment and education of children and teenagers this is a problem, since children often have not yet developed sufficient motoric skills or the required patience to perform a lengthy manipulation process. Consequently, they may very soon loose interest in a virtual construction game.

SUMMARY OF THE INVENTION

The above and other problems are solved by a computer-implemented method of manipulating a three-dimensional virtual building block model by means of two-dimensional cursor movements, the virtual building block model including a plurality of virtual building blocks each including a number of connection elements for connecting the virtual building block with another virtual building block according to a set of connection rules, the method comprising providing a digital representation of a structure comprising a number of said virtual building blocks in a three-dimensional coordinate system;

positioning, by means of cursor movements in a two-dimensional computer display area representing a projection of said structure, a two-dimensional projection of a first virtual building block to be connected to the structure, resulting in two-dimensional position coordinates;

determining, from the two-dimensional position coordinates, a number of three-dimensional candidate positions of the first virtual building block in the three-dimensional coordinate system; and selecting one of said candidate positions based on the connection rules and a predetermined set of position rating rules; and connecting the first building block to said structure at the selected candidate position.

Hence, an efficient method for manipulating a digital representation of a three-dimensional object is provided which resolves a position in a 2D display area into a corresponding 3D position in a way which is intuitive for the user, thereby making it considerably easier for a user to manipulate a 3D virtual structure. The user may simply position a new building block within the 2D screen area, thereby merely fixing the coordinates of the new building block along two directions. A suitable one of a plurality of possible 3D positions consistent with the 2D placement is then automatically determined according to a number of connection rules and a set of position rating rules.

In particular, by selecting one of a number of candidate positions according to a predetermined set of positions rating rules, the process results in positioning the building block at a position in the 3D scene that is likely to correspond with the user's intention.

It is a further advantage that positions which are not consistent with the connection rules for the connection elements are rejected. For example, there may be a considerable variety of different connection elements in a construction system, e.g. protrusions of different shapes and/or sizes and different types of cavities for engaging with corresponding ones of the protrusions.

By selecting a candidate connection element close to a connection element of the new building block assuming that the new building block is placed in a candidate 3D position consistent with the 2D placement, and by testing whether a valid connection is possible with this candidate connection element, the 2D placement of the new building block on the computer screen is correctly resolved into a 3D position within the 3D model. Furthermore, 2D-to-3D resolutions that would cause invalid connections according to a set of connection rules are avoided, e.g. connections of a protrusion with a cavity of a different type.

Hence, it is an advantage that the virtual building blocks are consistent with the physical limitations of a corresponding real-world construction set, thereby improving the educational value of a virtual construction game. In particular, a virtual construction may subsequently be transferred into a physical model by constructing a physical model from the same types of building blocks.

It is a further advantage that the method provides a large degree of freedom of movements and connections. For example, a building block may be positioned and connected in any direction. In particular, connections to other building blocks both in horizontal and vertical planes are possible. Furthermore, building blocks are correctly positioned even if they are rotated, e.g. around a vertical or a horizontal axis.

Preferably, the positioning of the graphical representation is controlled by control commands received from a user via a suitable input device such as a pointing device. For example, the positioning may be performed as a standard cursor manipulation technique, such as a "drag-and-drop" operation, a "click-drag-release" operation, or the like.

In a preferred embodiment the step of determining a number of three-dimensional candidate positions further comprises determining a number of candidate orientations of the first virtual building block in the three-dimensional coordinate system. By rotating the first building block to obtain candidate positions of a rotated building block the user-controlled 2D position is resolved into a 3D placement and an orientation in three dimensions, thereby determining all six degrees of freedom of placement in a 3D scene merely on the basis of a single cursor control in the 2D screen area. When the rotation of the first building block is limited to a predetermined space angle around a user-selected orientation, confusing rotations, such as a complete flipping around of the building block, is avoided, thereby avoiding disorientation of the user. In this embodiment, further orientations may be achieved by allowing a user to select an orientation of the virtual building block.

In a preferred embodiment, the method further comprises
determining a number of candidate connection elements of said structure, each of the candidate connection elements having a projection in the two-dimensional display area within a predetermined neighbourhood around a projection of a connection element of the first virtual building block;

selecting one of said candidate connection elements based on the connection rules and the predetermined set of position rating rules; and if a connection between the first virtual building block and said structure is valid according to the set of connection rules, connecting the first virtual building block with the structure via at least the selected candidate connection element.

Hence, a computationally efficient method of detecting candidate positions is provided, since the detection only relies on positions and properties of individual connection elements. Furthermore, and efficient selection mechanism is provided for selecting a 3D position that most likely corresponds to the user's intention.

A particularly advantageous rating of connection elements is provided when the rating comprises one or more of the following rating rules:

rating the candidate connection elements with respect to their distance from a virtual camera position;

Discarding candidate connection elements that are not visible from the current virtual camera position; and rating the candidate connection elements with respect to the distance of their two-dimensional projections to the two-dimensional projection of the corresponding connection element of the first virtual building block.

In particular, a reliable 3D positioning is achieved when the rating rule is based on a combination of the distance from a virtual camera position and on the respective distances of their two-dimensional projections to the two-dimensional projection of the corresponding connection element of the first virtual building block.

In a preferred embodiment, the digital representation of said structure comprises, for each virtual building block, a number of regular grids corresponding to at least one of the surfaces of the virtual building block, each regular grid comprising a number of grid points, each grid point representing a connection element. Hence, a systematic framework is provided that allows a correct resolution of 3D positions and correct interconnection of a large number of different building blocks, even if the building blocks have a large number of connection elements and even different types of connection elements.

Preferably, said predetermined neighbourhood around a projection of a connection element of the first virtual building block has a linear dimension, such as a diameter, corresponding to the distance between neighbouring grid points of the corresponding regular grid. Consequently, a precise and fine-grained user-controlled placement is provided that yields 3D resolutions and building block connections which are predictable and transparent for the user.

Further preferred embodiments are disclosed in the dependant claims.

The present invention may be implemented in different ways including the method described above and in the following, a data processing system, and further product means, each yielding one or more of the benefits and advantages described in connection with the first-mentioned method, and each having one or more preferred embodiments corresponding to the preferred embodiments described in connection with the first-mentioned method.

It is noted that the features of the method described above and in the following may be implemented in software and carried out in a data processing system or other processing means caused by the execution of computer-executable instructions. The instructions may be program code means loaded in a memory, such as a RAM, from a storage medium or from another computer via a computer network. Alternatively, the described features may be implemented by hardwired circuitry instead of software or in combination with software.

The invention further relates to a computer program comprising program code means for performing all the steps of the method described above and in the following when said program is run on a computer. The computer program may be embodied as a computer-readable storage medium, as a data signal embodied as a carrier wave, or the like.

The invention further relates to a computer program product comprising program code means stored on a computer readable medium for performing the method described above and in the following when said computer program is run on a computer.

BRIEF DESCRIPTION OF THE DRAWING

The invention will be explained more fully below in connection with a preferred embodiment and with reference to the drawing, in which:

FIGS. 6a-b illustrate an example of the positioning of a new building block on top of a previously placed building block;

DETAILED DESCRIPTION OF PREFERRED EMBODIMENTS

Figure 1A:
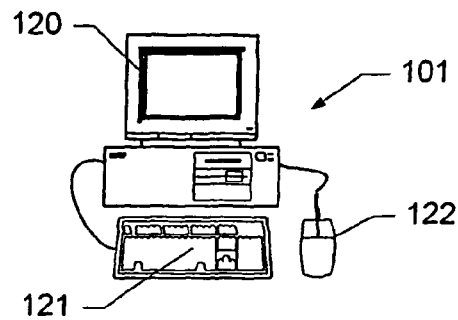
FIGS. 1a-b show a data processing system for generating and manipulating computer-readable models of geometrical objects.
Figure 1B:
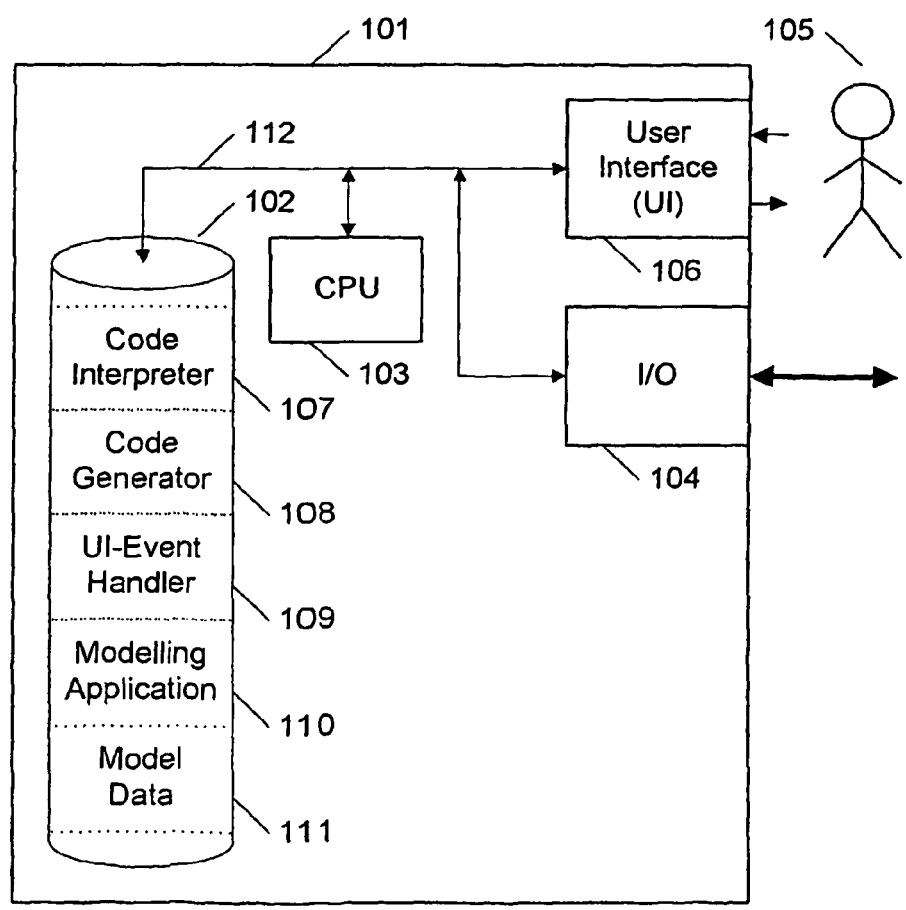

FIGS. 1a-b show a data processing system for generating and manipulating computer-readable models of geometrical objects.

FIG. 1a shows a schematic view of an example of a computer system. The computer system comprises a suitably programmed computer 101, e.g. a personal computer, comprising a display 120, a keyboard 121 and a computer mouse 122 and/or another pointing device, such as a touch pad, a track ball, a light pen, a touch screen, or the like.

The computer system designated 101 is adapted to facilitate designing, storing, manipulating, and sharing of virtual building block models. The computer system 101 can be used as a stand-alone system or as a client in a client/server system.

FIG. 1b shows a block diagram of a data processing system for generating and manipulating computer-readable virtual building block models. The computer 101 comprises memory 102 which may partly be implemented as a volatile and partly as a non-volatile memory means, e.g. a random access memory (RAM) and a hard-disc. The memory has stored thereon model code interpreter 107, model code generator 108, UI-Event Handler 109, and Modelling Application 110, each executable by the central processing unit 103. Further, the memory has stored therein Model Data 111, i.e. a set of data structures representing a digital representation of a physical object, e.g. a virtual building block model. An example of a data format for storing virtual building models is disclosed in U.S. Pat. No. 6,389,375.

The Code Interpreter 107 is adapted to read and interpret code defining a model, i.e. code representing the data structures of the building blocks of a model. In a preferred embodiment the Code Interpreter is adapted to read a model and to convert such a model into a known graphic format for presentation on a computer display.

The UI-Event Handler 109 is adapted to convert a user's interaction with a user interface into proper user commands recognisable by the Code Generator 108. A set of possible and recognisable commands can comprise: Getting a building block from a library of elements, placing a building block to be connected to another building block, disconnecting a building block, discarding a building block, manipulating a building block, a group of building blocks, etc., e.g. by initiating a rotation, etc. Along with each command, there may be associated a set of respective parameters, e.g. cursor coordinates with respect to the display coordinate system, types of building blocks, etc.

The Code Generator 108 is adapted to modify the data structures of a model in response to a user's commands. As a concurrent or subsequent task, the Code Interpreter can be executed for presenting the result of the Code Generator.

The Modelling Application 110 is adapted to control memory, files, the user interface, etc.

A user 105 is capable of interacting with the computer system 101 by means of the user interface 106, preferably comprising a graphical user-interface displayed on a computer screen, and one or more input devices such as a keyboard and/or a pointing device.

In order to load, save, or communicate models, geometrical descriptions, or other data, the computer system comprises an input/output unit (I/O) 104. The input/output unit can be used as an interface to different types of storage media and different types of computer networks, e.g. the Internet. Further, the input/output unit (I/O) 104 can be used for exchanging models with other users e.g. interactively.

Data exchange between the memory 102, the central processing unit (CPU) 103, the user interface (UI) 106, and the input/output unit 104 is accomplished by means of the data bus 112.

Figure 2:
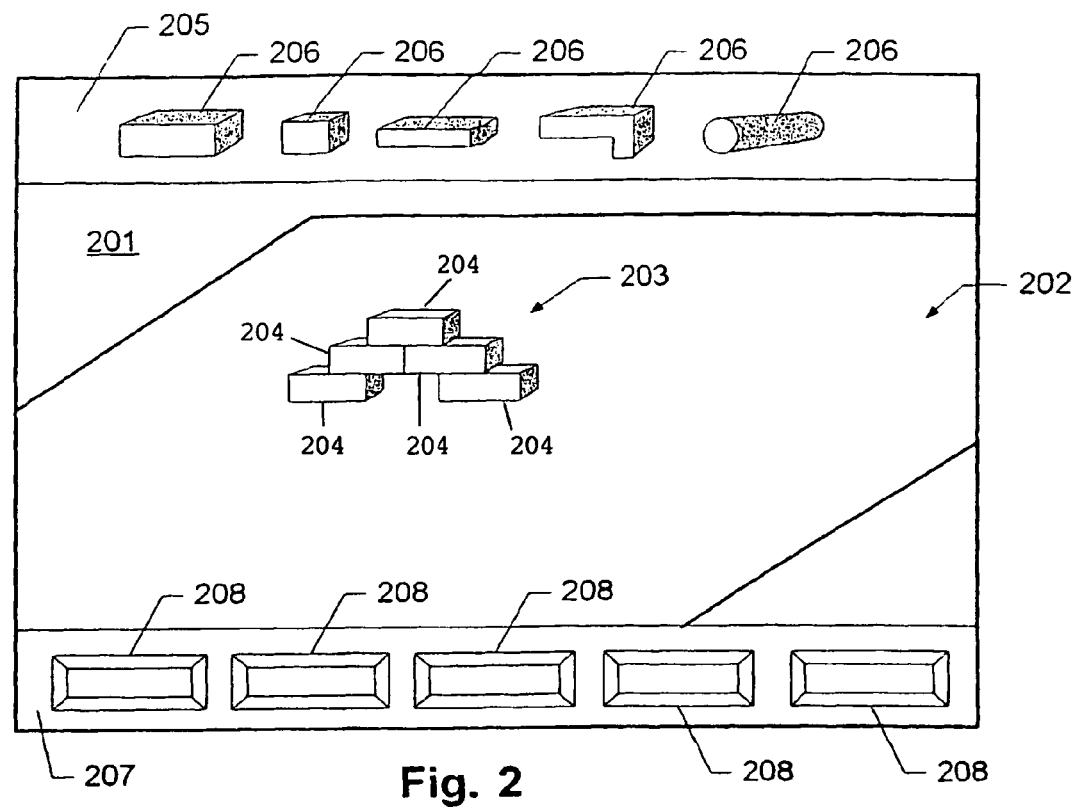
FIG. 2 shows a graphical user-interface of a virtual building block system.

FIG. 2 shows a graphical user-interface of a virtual building block system.

The user-interface comprises a display area 201 showing a view of a 3D scene with a base plate 202 and a 3D structure 203 comprising a number of interconnected virtual building blocks 204. The scene is shown from a predetermined viewpoint. In the following, this viewpoint will also be referred to as the (virtual) camera position, as it correspond to a position from which a camera would record a picture of a real structure corresponding to the graphical picture shown in the display area.

Each of the building blocks 204 corresponds to an active element of the graphical user-interface that may be activated, e.g. by clicking on it with a computer mouse, to select that building block. In one embodiment, a selected virtual building block changes appearance. For example, the selected building block may change colour, texture, etc.; it may be highlighted by showing a bounding box around the selected building block, or the like. A user may manipulate a selected building block, e.g. changing its properties, e.g. its colour, deleting it, performing a copy and paste operation, dragging it to a different position, or the like.

The user-interface further comprises a palette panel 205 comprising a number of different building blocks 206 that may be selected by the user. For example, a user may click on one of the building blocks 206 with the mouse, thereby selecting that building block, and drag the selected building block into the display area 201 to connect it to the structure 203 or to the base plate 202.

The user-interface further comprises a menu bar 207 comprising a number of menu buttons 208 for activating various functions or tools. For example, the tool bar may comprise a rotation tool for changing the virtual camera position, thereby allowing the user to view the building area from different directions. The menu bar may further comprise a zoom tool for zooming in and out to/from the 3D scene. Other examples of tools include a palette tool for selecting different palettes 205 each comprising a different set of building blocks, a colouring tool for colouring parts of the structure, an eraser tool for erasing building blocks, etc.

The menu bar 207 may further provide standard functions, such as functions for saving a model, opening a previously saved model, printing an image of a model, a help function, etc.

FIGS. 3a-d illustrate examples of building blocks and their connection elements.

Figure 3A:
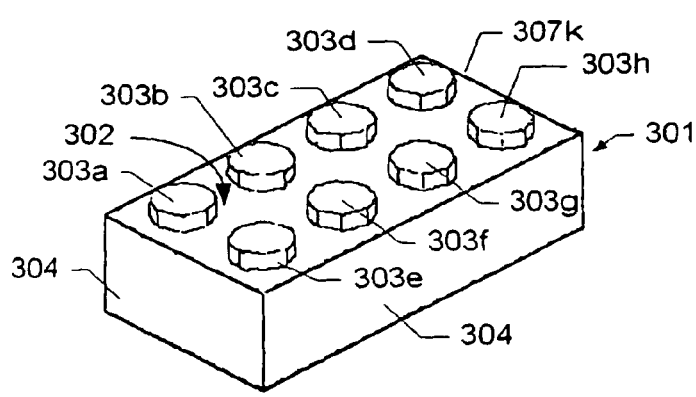
FIGS. 3a-d illustrate examples of building blocks and their connection elements.

FIG. 3a shows a perspective view of a building block building block 301. The building block 301 has a top surface 302 with eight knobs 303a-h that can engage with corresponding holes of another building block, e.g. holes on the bottom surface of another building block. Correspondingly, building block 301 comprises a bottom surface (not shown) with corresponding holes. The building block 301 further comprises side faces 304 that do not comprise any connection elements.

Generally, the connection elements may be grouped into different classes of connection elements, e.g. connectors, receptors, and mixed elements. Connectors are connection elements which may be received by a receptor of another building block, thereby providing a connection between the building blocks. For example, a connector may fit between parts of another element, into a hole, or the like. Receptors are connection elements which can receive a connector of another building block. Mixed elements are parts that can function both as a receptor and a connector, typically depending on the type of the cooperating connection element of the other building block.

Figure 3B:
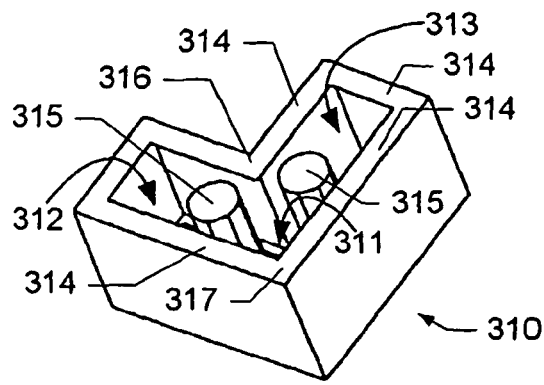

FIG. 3b shows a perspective view of a building block 310 seen from below. The building block 310 has a non-rectangular top and bottom face. The bottom face comprises holes 311, 312, and 313 for receiving corresponding knobs of one or more other building blocks, e.g. the building block 301 of FIG. 3a. The holes are defined by the edges 314, by secondary pins 315, as well as the corners 316 and 317. Hence, the properties of all of the above elements determine the connectivity properties of the bottom face of the building block 310.

Figure 3C:
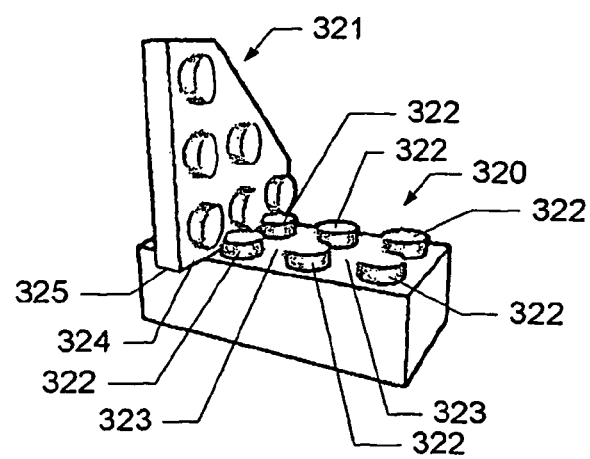

FIG. 3c illustrates a building block 320 being connected with a building block 321, thereby forming a combined building block. Building block 320 comprises knobs 322 on its top face which fit into corresponding holes of another building block. However, as is illustrated by FIG. 3c, other types of connections may be achieved as well: The gaps 323 between the knobs function as receptors for other connectors, such as the side face 324 of block 321. For physical building blocks this property is determined by the dimensions of the gaps and the dimensions of the building block 321, i.e. the width 325 of its sides. In a digital representation, however, these properties are represented by corresponding attributes of connection points on a regular grid, as will be illustrated in greater detail below.

Figure 3D:
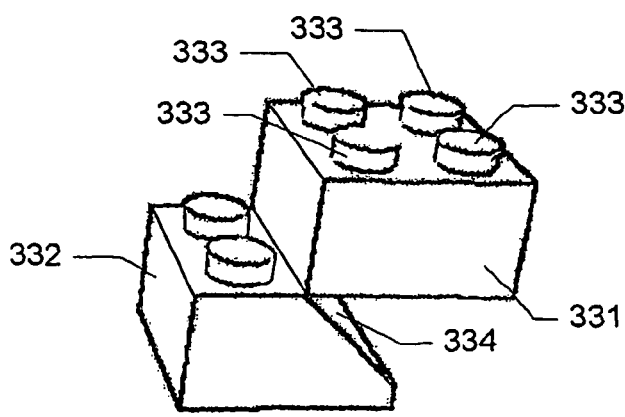

FIG. 3d shows two building blocks 331 and 332. Building block 331 is a brick having four knobs 333 on its top face and four corresponding holes on the bottom face (not shown). Brick 332 is an example of a building block with a surface that comprises planes which are not mutually orthogonal. Specifically, building block 332 has a slanted face 334. As is illustrated in FIG. 3d, in their current positions, the building blocks 331 and 332 do not connect, since there are no connection elements that, in the shown position, engage with each other.

It is understood that the above building blocks merely serve as examples of possible building blocks.

Figure 4A:
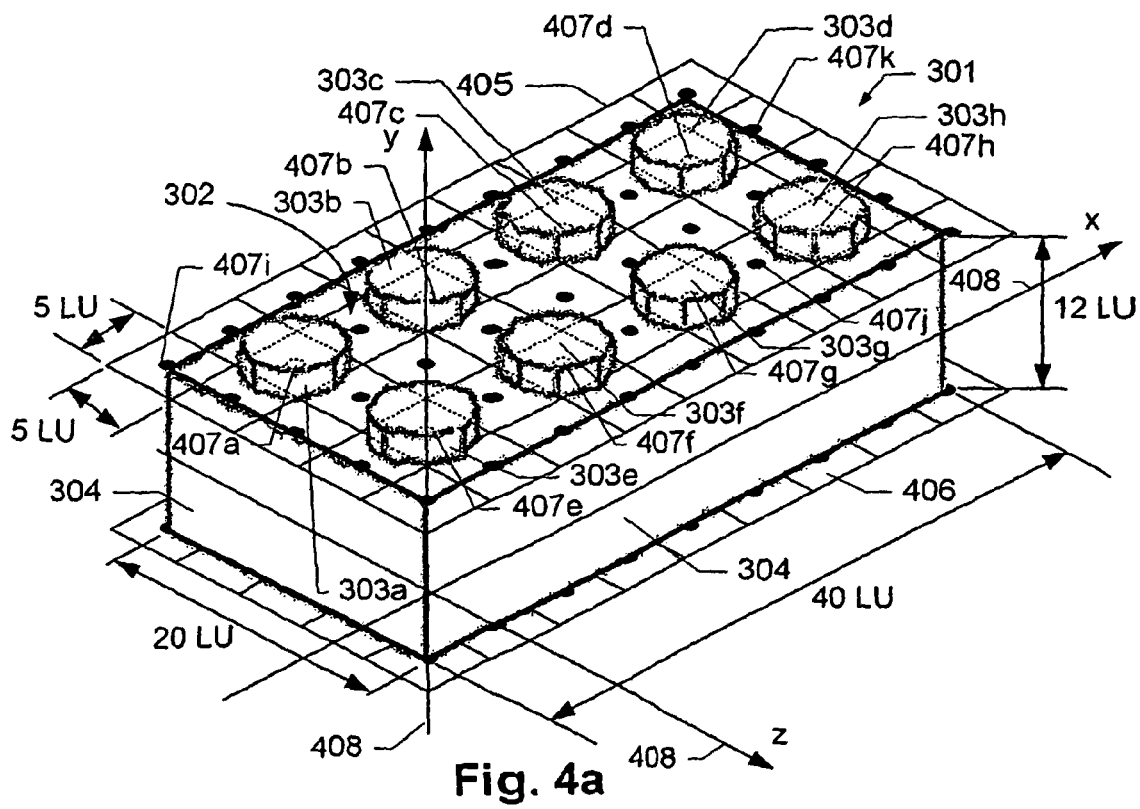
FIGS. 4a-b illustrate an embodiment of a digital representation of a physical building block.
Figure 4B:
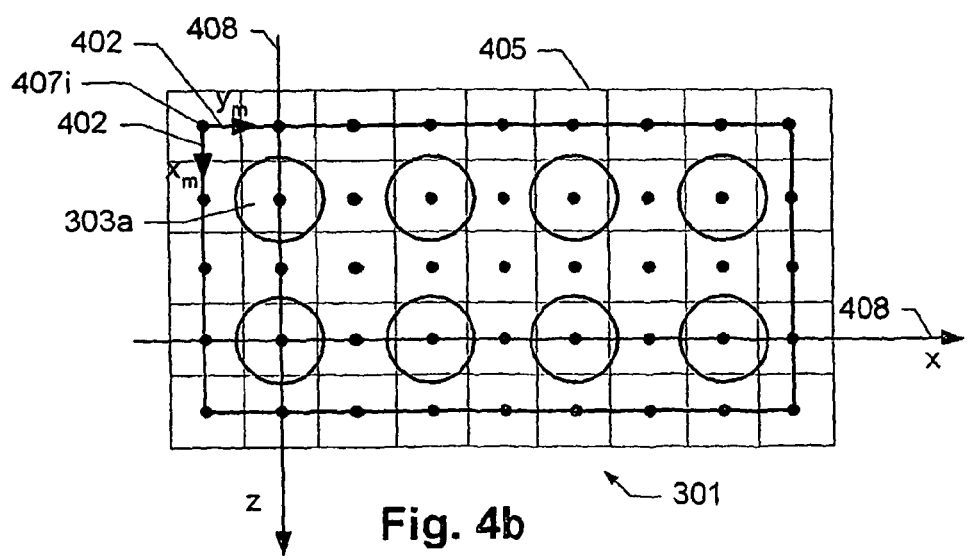
Figure 4C:
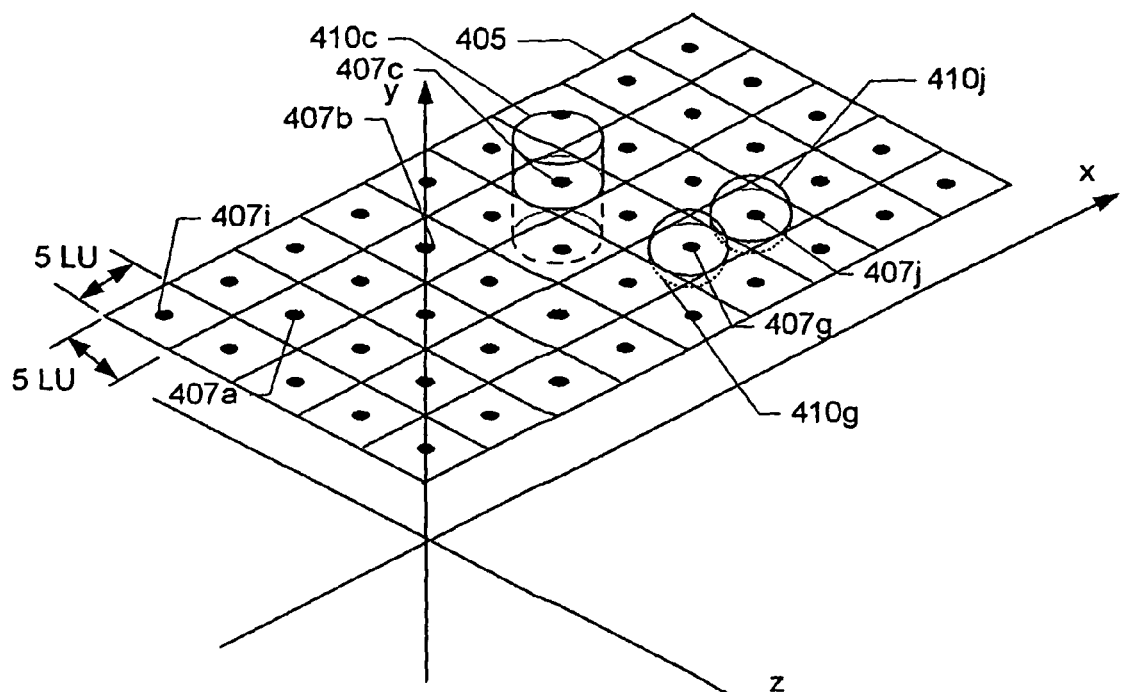
FIG. 4c illustrates examples of volume elements around connection points.

FIGS. 4a-c illustrate an embodiment of a digital representation of a physical building block. A digital representation of a physical building block comprises a data structure stored in the memory of a computer where the digital representation represents the properties of that building block. According this embodiment, the connection elements of a building block may differ in nature, shape, connection properties, etc. However, their locations on the building blocks follow a set of rules:

A building block has a number of planes associated with it, e.g. the planes defined by the surface of a bounding box of a building block. The connection elements of the building block are located in these planes, such that each connection element has an axis associated with it. The axes of all connection elements in the same plane correspond to respective grid points, so-called knots, of a regular grid, e.g. an orthogonal grid, with fixed distances between neighbouring grid points. Preferably, the planes associated to a building block are pairwise parallel to each other, e.g. by defining a set of horizontal planes corresponding to the top and bottom faces of a building block and a number of vertical planes corresponding to the side faces of the building block. Preferably, the distances between neighbouring grid points are the same in all horizontal planes. In one embodiment, the distances between neighbouring grid points in vertical planes are different from the distances between neighbouring grid points in horizontal planes.

FIGS. 4a-b schematically illustrate how an embodiment of a data structure describes the properties of the building block 301 of FIG. 3a. In FIGS. 4a-b, the building block 301 is shown with its corresponding orthogonal grids 405 and 406 of the top surface and the bottom surface, respectively. FIG. 4a shows a perspective view of the building block, while FIG. 4b shows a top view of the building block. In FIGS. 4a-b grids on the side faces of the building block 301 are not shown. Some examples of building blocks, e.g. building block 301, do not have any connection elements on some of the faces, e.g. on the side faces. Other examples of building blocks may have connection elements on all sides.

The orthogonal grids will also be referred to as connectivity grids and the grid points will also be referred to as connection points. The connection points are illustrated by circles as exemplified by circles 407a-k. Hence, connection points 407a-h correspond to knobs 303a-h, respectively. As the side surfaces 304 do not have any connection elements, no connection grids need to be defined for them. In an alternative embodiment, connection grids comprising only void receptors may be defined for the side surfaces, i.e. receptors that neither connect nor repel other connection elements.

The digital representation of the building block is described with respect to an internal right-handed coordinate system 408. It is understood that the choice of coordinate system, in particular the location of its origin and the directions of the axes, may be selected according to any suitable convention. Hence, in a corresponding data structure the position and orientation of the building block in a 3D scene may be represented by the coordinates of the origin and the direction of the axes of the coordinate system 408 with respect to an external coordinate system, e.g. the coordinate system of another building block or a global "world" coordinate system.

As can be seen from FIG. 4a, a representation of the connection elements of the building block by the connection points placed in a regular grid, imposes certain constraints on the physical placement of the connection elements on the physical building blocks. The grid 405 is located in the plane of the top surface of the building block from which the knobs 303 extend.

In the example of FIGS. 4a-b, the grid points are placed in a square grid where each square has a dimension of 5×5 units of an arbitrary length unit (LU). Hence, in this geometry, the connection elements are also placed on a corresponding square grid, and the distance between connection elements in a plane of the building block is a multiple of 10 LU. In the example of FIG. 4, the upper and lower surfaces of the building block are rectangular and have a dimension of 20 LU×40 LU, and neighbouring connection elements are spaced apart by 10 LU. In the vertical direction, on the other hand, the connection elements are spaced apart by 12 LU.

The location of the connection points is defined with respect to the internal coordinate system 408 of the building block. Each grid point further has a direction associated with it, indicating in which direction the connection element may engage with a corresponding connection element. The direction of the grid points is orthogonal to the planes and pointing out of the bounding box, i.e. in FIG. 4b pointing out of the plane of the drawing.

In one embodiment a data structure representing the grid of connection points comprises, for each connection point: The coordinates of the connection point with respect of the coordinate system 408, the direction of the connection element, and a connectivity type.

In one embodiment, a data structure representing a building block comprises a building block ID, a data structure describing the position, orientation and dimension of a bounding box of the building block, and a number of data structures describing the respective grids and their corresponding connection points. A data structure representing a grid of connection points comprises:

The coordinates with respect to the coordinate system 408 of a grid point used as an origin of a local grid coordinate system. In the example of grid 405, grid point 307i is used as origin having coordinates $P_0=(-5, 12, -15)$ in LUs.

The direction of the connection elements. In the example of grid 405, this is (0, 1, 0), i.e. the direction of the y-axis of the coordinate system 408.

The number of grid points in x and z direction. In the example of grid 405, $n_x=9$ and $n_z=5$, respectively.

an array of $n_x \times n_z$ data structures, each comprising the connection properties of a corresponding connection point. The data structure of each grid point comprises a connection type of the connection point, e.g. "hole", "edge", "knob", etc.

In one embodiment, each connection point further has a volume element associated with it defining a neighbourhood around that connection point.

FIG. 4c illustrates examples of volume elements around connection points. In one embodiment, each connection point has associated with it a sphere with its centre in the connection point. In FIG. 4c, this is exemplified by connection points 407g and 407j of the connection grid 405 of the building block 301 above. For the connection points 407g and 407j corresponding spheres 410g and 410j, respectively, are indicated. The spheres have a radius equal to half the distance between adjacent connection points, e.g. 2.5 LU in the example of FIG. 4a-b. It is understood that, in alternative embodiments, the spheres may be smaller or larger, i.e. they may intersect or there may be a gap between spheres of adjacent spheres, thereby allowing a control of the sensitivity of the positioning method with respect to small misplacements.

It is further understood that different kinds of volume elements may be used as well. For example, the volume elements may be cylinders around the connection elements, as exemplified by cylinder 410c around connection point 407c. In this example, the cylinder has a radius of 2.5 LU and a height of 5 LU. Further examples of volume elements include cubes, ellipsoids, etc.

It is further understood that, in some embodiments, different types of connection elements may be associated with different volume elements, e.g. volume elements of different sizes, e.g. different radius and/or different heights, or even different geometrical shapes. In such an embodiment, the data structures representing the connection points may further comprise one or more parameter identifying the type and/or dimension(s) of the associated volume element.

It is understood that, when graphically representing the building block on a display, e.g. a computer screen, the bounding volumes, coordinate systems, volume elements, and grids do not need to be shown. Preferably, a graphical representation only includes a graphical rendering of the building block itself.

Figure 5:
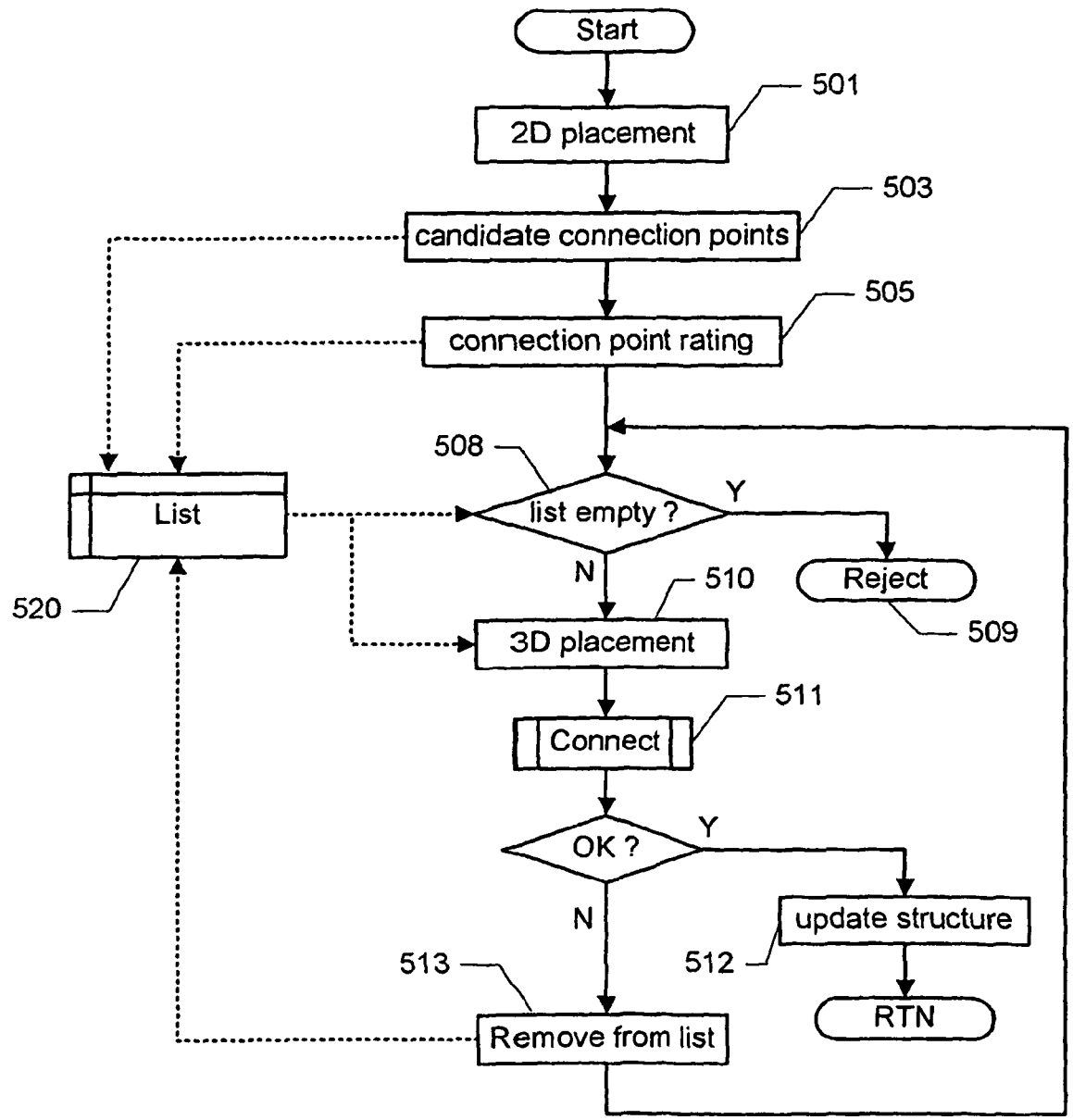
FIG. 5 shows a flow diagram of a process of positioning a building block in a 3D scene and connecting it to a structure of building blocks that is already present in that scene.

In the following, a process of placing a new virtual building block into a scene including a 3D structure will be described in more detail. Reference will be made to FIGS. 5 and 6a-b.

FIG. 5 shows a flow diagram of a process of positioning a building block in a 3D scene and connecting it to a structure of building blocks that is already present in that scene.

In step 501, a new building block is placed into the scene, e.g. by selecting a building block on a palette and dragging a graphical representation of the building block to a user-selected position in the 2D display area according to the mouse movement where the 2D display area represents a 2D projection of the 3D scene. In one embodiment, when the motion of the mouse stops for at least a predetermined time, e.g. as detected by a GUI event handler, the process proceeds at step 503.

FIGS. 6a-b illustrate an example of the positioning of a new building block on top of a previously placed building block. The new building block 601 is illustrated as a bounding box 620 having a top face 621 and a bottom face 622, each comprising a number of connection points, generally designated 603, of a connection grid, as described above. Similarly, the previously placed building block 602 has a number of connection points, generally designated 604. Connection grids and connection points of the side faces of building blocks 601 and 602 are not shown in FIG. 6a. In this example, the 3D scene comprises only one previously placed building block 602.

FIG. 6a illustrates a 2D projection of the building blocks 601 and 602 as seen on the 2D display area 600 of a computer screen, corresponding to a 2D display coordinate system 630.

FIG. 6b illustrates the relation between the 2D projection in the display area 600 and the 3D positions of the building blocks 601 and 602 in the 3D coordinate system 640. When the new building block 601 is placed on the screen 600, only its coordinates in the 2D coordinate system 630 are determined, and any 3D position yielding the projection 601a is consistent with this projection, as illustrated by the dashed projection lines 631. Hence, the user-controlled placement of the building block on the screen does not provide information about the third dimension orthogonal to the display area. In FIG. 6b, the projection is a parallel projection, i.e. the projecting lines 631 are parallel to each other, corresponding to a virtual camera position 632 infinitely far away from the projection plane 600.

Again referring to FIG. 5, in step 503, the process determines, for each connection point of the new building block whether there is a connection point belonging to any building block (or to the base plate, if any) already present in the scene that has a 2D projection within a predetermined neighbourhood of the projection of that connection point of the new building block. In one embodiment, for each connection element of the new building block a circle around the connection element in the display area is determined. Similarly, corresponding circles of connection elements which are already in the scene are determined. If any of these circles overlap with the circle of the connection element of the new building block, the corresponding connection elements are selected as candidate connection elements.

In FIG. 6a, this step is illustrated for a connection point 605 of the new building block 601. Reference numeral 606 designates a circle around the connection element 605. Similarly, reference numerals 608, 610, and 612 designate circles of connection elements 607, 609, and 611, respectively, of building block 602 which overlap with circle 605. Hence, in this example, connection elements 607, 609, and 611 are determined as candidate connection elements. It is understood that, in this example, further connection elements would be selected. However, their circles are not shown in FIG. 6b.

It is noted that the circles 606, 608, 610, and 612 correspond to projections of corresponding spheres around the connection elements 605, 607, 609, and 611, respectively. It is understood that, in alternative embodiments, projections of different types of volume elements may be used in order to determine which connection elements have projections in a neighbourhood of the connection elements of the new building block. Further examples of volume elements have been described in connection with FIG. 4c above. When using spheres, the determination of the corresponding projection is particularly efficient, since the projection of a sphere is always a circle, irrespective of the viewpoint.

In a preferred embodiment, the diameter of the circles corresponds to the distance between neighbouring connection points in each of the grids.

It is further understood that, in some embodiments, the search for candidate connection elements may be limited to a subset of connection elements of the building blocks that are already present in the scene, thereby reducing the time necessary to complete the search and the size of the resulting list of candidate connection elements. For example, the search may be limited to connection elements that are not already connected to another connection element. In one embodiment, the search is limited to connection elements having suitable connection properties, i.e. connection elements which can actually be connected to the connection elements of the new building block, as will be described in greater detail below.

Step 503 results in a list 520 of candidate connection elements of the building blocks that are already present in the scene. Consequently, the 3D coordinates of the candidate connection elements are known. In one embodiment, each entry in the list 520 comprises the 3D coordinates of a candidate connection point of the building block already present in the scene, an identifier identifying the corresponding building block, and an identifier and/or coordinates identifying the corresponding connection element of the new building block.

In step 505, the list 520 of candidate connection elements is sorted by rating the candidate connection elements according to a predetermined set of rating rules.

In one embodiment, the candidate connection elements are rated according to their distance from the virtual camera, i.e. their relative distance from the plane of projection corresponding to the display area 600, and according to the 2D distance of the candidate position and the user-selected placement, i.e. the displacement of the projection in the display area of the candidate position from the position of the graphical representation of the new building block. For example, connection elements for which the candidate position is closer to the camera position may be rated higher, i.e. more likely to correspond to the position intended by the user. Likewise, candidate connection points for which the displacement from the user-selected position in 3D is high may be rated lower.

In some embodiments, the ordering is performed according to other criteria in addition or alternatively to the above conditions. Examples of such position rating rules may include one or more of the following:

- the relative distance from the camera position;
- the displacement from the user selected 2D position;
- the degree of necessary rotation of the building block, in order to allow for a connection with the candidate connection element.
- A visibility test, e.g. whether the candidate connection element is visible from the current camera position. In some embodiments candidate connection elements which are not visible from the current camera position are discarded from the list.

In some embodiments, several or all of the above criteria may be used in combination, e.g. by defining a cost function to which the above conditions contribute, optionally with respective weighting factors. In other embodiments, a rating is first performed according to one of the above rules, e.g. the necessary 2D displacement. If two or more candidate connection elements have the same rating, a further rule may be used to distinguish between them, e.g. the relative distance from the camera, the necessary rotation, or the like.

Hence, a rating of the determined candidate connection elements is achieved and the ordered list 520 corresponds to an ordered list according to the above rating. At this point, the ordered list 520 comprises all candidate connection points that are not discarded based on the above position rating rules.

In step 508 it is determined whether the ordered list 520 is empty. If the list is empty, i.e. there were no connection elements having a sufficiently small projected distance to a connection element of the new building block, the 3D placement is refused (step 509), i.e. the process terminates; otherwise, the process continues at step 510.

If the process terminates by refusing 3D placement (step 509), this is preferably indicated to the user, e.g. by providing a visual indication. For example, the graphical representation of the building block which is moved in response to the mouse movements may be shown in a form that indicates that the building block has not been placed yet. Only when a 3D placement is found, the graphical representation switches, thereby indicating to the user that the placement is completed. For example, as long as the 3D placement is not successfully completed, the building block may be shown transparent and/or with a visible bounding box and/or blinking and/or in any other suitable form.

In step 510, the candidate connection element having the highest rating is selected, and the new building block is placed in the 3D coordinate system such that the coordinates of the selected candidate connection point and the corresponding connection point of the new building block coincide. Hence, a candidate position according to the highest rating is selected. It is understood that this placement is only tentative, i.e. it is not yet displayed on the computer screen.

In step 511, the process verifies whether the connection is in accordance with a predetermined set of connection rules, for example whether the connection elements at these and other connection points of the new building block allow a connection with the connection elements of the building block(s) to which the new building block is to be connected. This test, an embodiment of which will be described in greater detail below, will also be referred to as connectivity verification. In a preferred embodiment, the process further verifies whether the new building block, when connected to the candidate connection element, would be visible from the camera position or whether it would be completely obstructed by the existing structure. If the connection is refused or the building block would not be visible, the tentative 3D placement is rejected and the process continues at step 512; otherwise, if the process successfully verifies the connection, the process continues at step 513.

In step 512, the candidate connection point for which connection was refused is removed from the order list 520, and the process returns to step 508, i.e. the next candidate connection point, if any, is selected.

In step 513, i.e. if the connection test was successful, the 3D placement is accepted, i.e. the graphical representation of the structure is updated by "snapping" the new building block in the accepted position and by changing the appearance of the building block. In one embodiment, the user may accept the position, e.g. by clicking with the mouse on the building block, thereby completing the placement process. If the user wishes to place the building block in another position, the user may simply move the mouse without clicking on the building, thereby changing the appearance of the new building block back to the original appearance and moving the building block into another position of the 2D display area.

The process maintains a set of data structures, each data structure representing a building block placed within the 3D scene, e.g. as described in connection with FIGS. 4a-b. When accepting the 3D placement of the new building block, the process updates the set of data structures by adding a new instance of the data structure corresponding to the new building block as a part of that set of data structures.

Figure 7A:
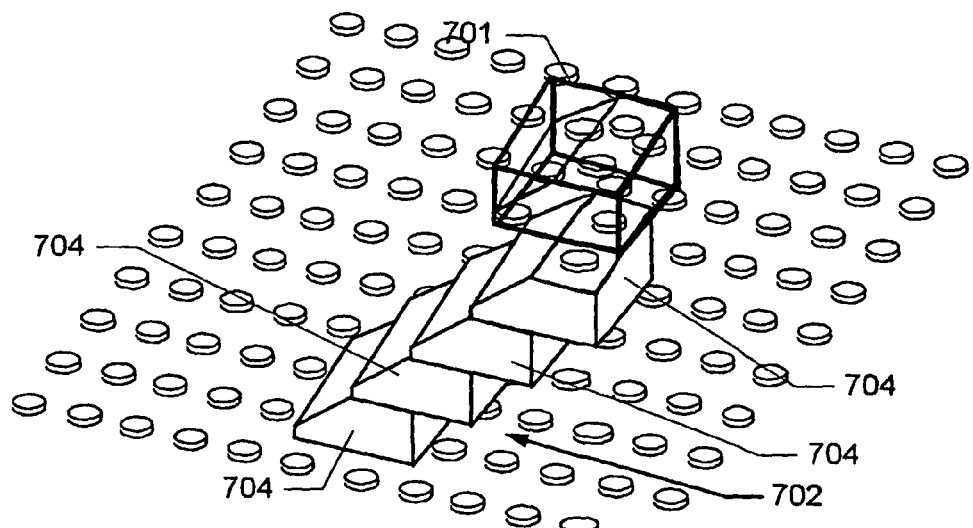
FIGS. 7a-b illustrate two positions of the a building block resulting from slightly different 2D placements of the graphical representation on the screen.
Figure 7B:
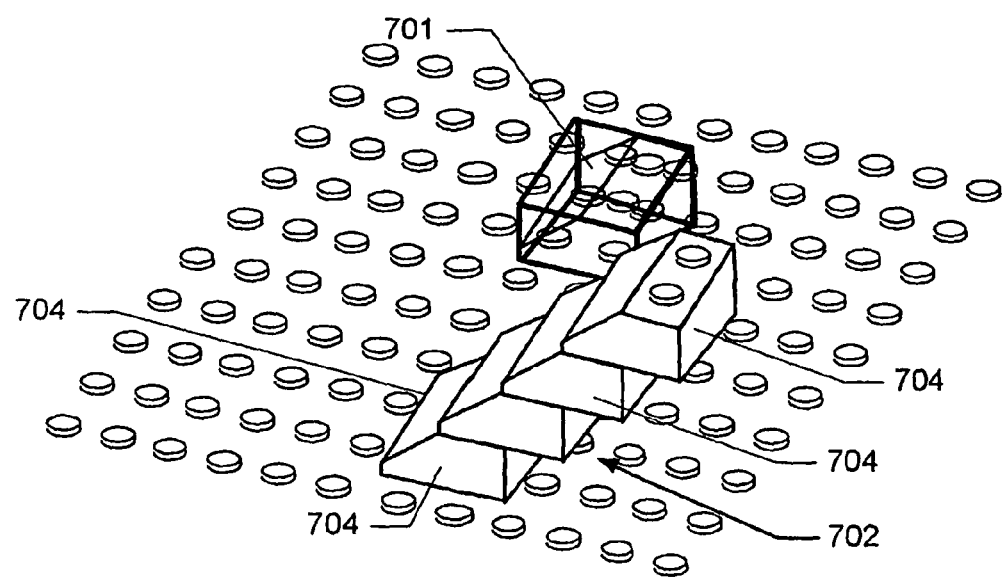

FIGS. 7a-b illustrate two positions of the new building block of FIGS. 6a-b resulting from slightly different 2D placements of the graphical representation on the screen. In FIG. 7a, building block 701 is placed on top of the structure 702. In FIG. 7b, on the other hand, the building block 701 is positioned on the base plate 703 behind the structure 702. Hence, a small adjustment of the 2D position of the new building block allows the user to differentiate between two rather different placements in the 3D scene. FIGS. 7a-b further illustrate a different appearance of the new building block 701 while it is manipulated by the user compared to the building blocks 704 of the structure 702.

Figure 8:
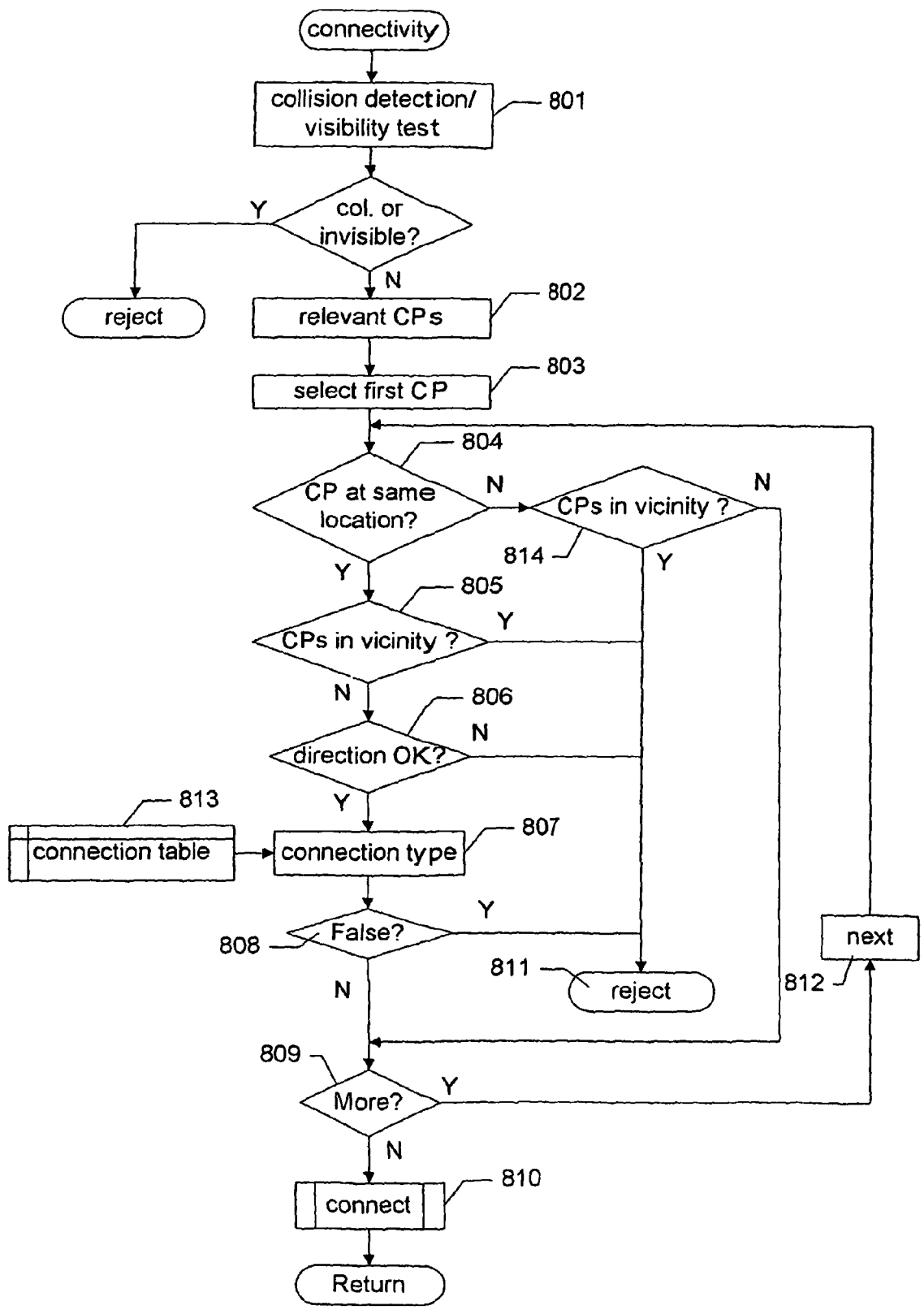
FIG. 8 shows a flow diagram of an embodiment of the sub-process of connectivity verification of a new building block in a tentative 3D placement.

FIG. 8 shows a flow diagram of an embodiment of the sub-process 511 of connectivity verification of a new building block in a tentative 3D placement. Hence, the process verifies whether the new building block can be connected to at least one other building block of an existing structure. The other building block will be referred to as the second building block.

In an initial step 801, the process performs collision detection and a visibility test, i.e. a detection whether the new building block intersects with any other building blocks already present in the scene and a test as to whether the new building would be completely obstructed by the existing structure and, thus, not visible from the current camera position. The collision detection may be performed by any suitable collision detection method, preferably a collision detection method based on a bounding volume of the building block. Examples of such algorithms are disclosed in e.g. David H. Eberly: "3D Game Engine Design", Morgan Kaufmann, 2001. Likewise, the visibility test may be performed by any suitable method known in the art. If an invalid intersection is detected, i.e. if the bounding volumes of the building blocks intersect, or if the building block would not be visible from the current camera position, placement of the building block at this position and orientation is rejected; otherwise, if the building block would be at least partially visible and if a valid intersection is detected, i.e. if at least part of the surfaces of the bounding boxes intersect but not their volumes, the process continues at step 802.

In step 802, all connection points of the new building block and of the second building block that belong to the detected intersection of the surfaces of the bounding boxes are determined. Only those connection points that are not already connected need to be considered; these connection points will be referred to as the relevant connection points.

In step 803, a first relevant connection point of the new building block is selected, e.g. an arbitrarily selected connection point.

In step 804, for the selected connection point of the new building block the process checks whether there are any relevant connection points of the second building block having the same coordinates as the selected connection point. In one embodiment, where the building blocks are placed in a discrete volume reference grid and all coordinates are multiples of an arbitrary length unit, an exact match of coordinates may be required. In a continuous or quasi-continuous reference coordinate system, it may be required that the grid points coincide within predetermined limits.

If no such matching connection point is found, the process continues at step 814.

In step 814, it is detected whether there are any other of the relevant connection points within a predetermined neighbourhood of the selected connection point. For example, in an embodiment where the distance between two adjacent connection elements is 10 LU, the predetermined neighbourhood may be selected to be the cube (x±5 LU, y±5 LU, z±5 LU) around the selected connection point at (x, y, z). If there are any other of the relevant connection points within a predetermined neighbourhood of the selected connection point, connection of the two building blocks is rejected (step 811) and the algorithm terminates. Hence, when the connection points in this embodiment are placed on a regular grid, an invalid placement of the building block may efficiently be detected: If a mismatch with a relevant connection point of the second building block is found for one of the relevant connection points of the new building block, the remaining connection points of the new building block do not need to be checked, thereby increasing the speed of the detection process.

If no conflicting relevant connection point is found in step 814, the process continues at step 809.

If a matching connection point was found in step 804, the process continuous at step 805, where it is detected whether there is any other relevant connection points within a predetermined neighbourhood of the selected connection point, e.g. in a cube (x±5 LU, y±5 LU, z±5 LU) around the selected connection point at (x, y, z), as described above. If another connection point is found in the predetermined neighbourhood, the position is rejected (step 811); otherwise, the process continuous at step 806.

In alternative embodiments, the above restriction may not be desired. Furthermore, in yet another embodiment, the above restriction may be limited to certain connection types.

In step 806, the process detects whether the selected connection point and the detected matching connection point have opposite directions, i.e. if their associated axes are along a common line, but in opposite orientation. Hence, only connection elements positioned in a relative orientation suitable for them to engage, are accepted.

It is noted that, in alternative embodiments, this limitation may be relaxed, e.g. by accepting a range of orientations in embodiments where the connection elements accept a range of orientations.

If the relative direction of the connection points are accepted, the process continues at step 807, otherwise, the position is rejected (step 811).

In step 807, the connection types of the selected connection point and the corresponding detected matching connection point are compared. In one embodiment, each connection point has an associated connection type, e.g. "knob", "hole", "edge", "corner", "hinge", "pin", "small pin", etc. The process has access to a connection table 813 stored in memory. The connection table comprises a connectivity type for all pairs of connection types, indicating how a particular pair of connection types influences the connection of two building blocks. For example, every pair of connection types may be associated to a connectivity type of "true", "false", or "void". Connectivity type "true" indicates that a connection is valid, and the corresponding connection elements engage to connect the two building blocks, e.g. a knob engaging with a corresponding hole. Connectivity type "false" indicates that a connection is not allowed. For example, a connection between a knob and a knob is not possible: Not only do they do not engage to provide a connection, but they even interfere/collide making a connection impossible. Finally, a connectivity type of "void" indicates that there is nothing that prevents a connection, but nothing that actually connects either. For example this is the case for a hole and a hole. Hence for a given pair of connection points, the process can retrieve the corresponding connectivity type from the stored connection table 813.

In the subsequent step 808, it is tested whether the connectivity result is "false", i.e. no valid connection is possible between the corresponding connection types. If the connectivity result is "false", the position of the new building block is rejected (step 811), otherwise the connectivity result is stored and the process proceeds to step 809.

In step 809 it is tested, whether all relevant connection points of the new building block have been processed. If not, a yet unprocessed relevant connection point is selected (step 812) and processed by performing the above steps 804, 805, 806, 807, and 808 with the now selected connection point.

If all relevant connection points of the new building block have been processed and the position has not been rejected, the position is accepted and the process continues at step 810. In step 810 it is determined, based on the stored connectivity results, how the building blocks connect, and their respective data structures are updated accordingly.

Initially, it is checked whether all connectivity results are "void". If yes, i.e. if nothing prevents a position of the building block, but none of the connection elements actually engage to connect the building blocks, the new building block is allowed in its present position. In one embodiment, an additional algorithm may decide, e.g. based on the bounding volumes, whether a physical building block placed in this position would fall down, tilt, etc. and allow or reject the position accordingly.

Otherwise, i.e. if one or more connectivity results are true, the process determines how the building blocks are connected, i.e. whether they are connected rigidly or whether the connection allows for a relative rotation, translation and/or the like.

Once the data structures are updated, the sub-process terminates and returns to the overall process of FIG. 5.

Figure 9A:
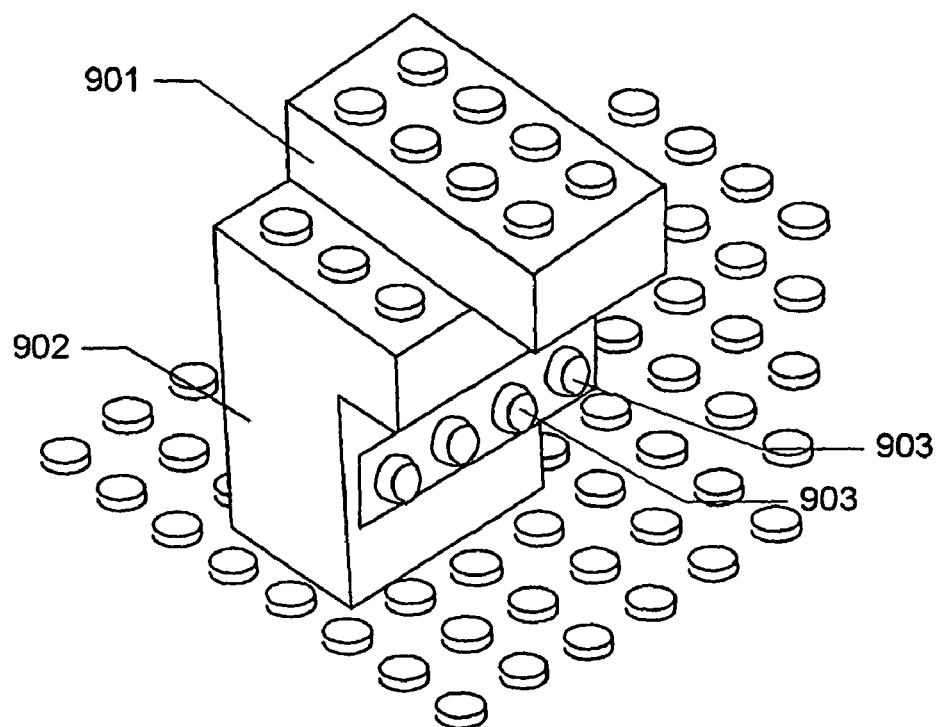
FIGS. 9a-b illustrate the connection of a building block including a rotation.
Figure 9B:
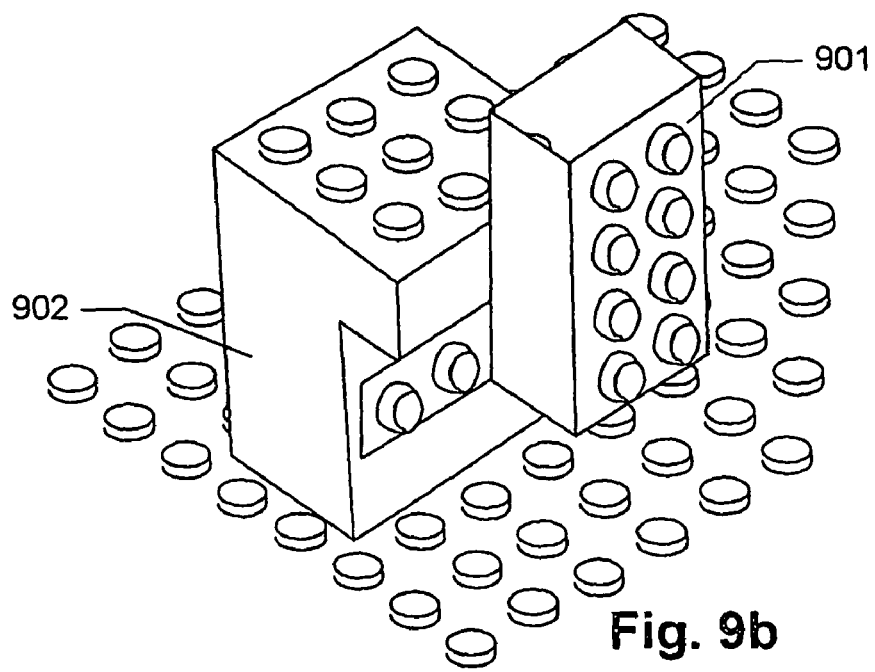

FIGS. 9*a-b* illustrates the connection of a building block including a rotation. In some embodiments, connection points are checked only for the orientation of the new building block that is visible on the screen, i.e. a user-selected orientation or a default orientation. When a user wishes to connect a new building block after a rotation of the building block, the orientation may be controlled by suitable user-interface controls, e.g. by means of a rotation tool that may be selected in a menu of the graphical user interface, by means of keyboard commands, or the like. For example, a user may control the orientation of the new building block to step through a sequence of discrete orientations, e.g. corresponding to 90 degree rotations around different axes. For example, in FIGS. 9*a* and 9*b*, the building block 901 is connected to the structure 902 in different ways, depending on the user-selected orientation of building block 901. In FIG. 9*a*, building block 901 is connected on top of the structure 902. In FIG. 9*b*, the building block 901 is connected to knobs 903 of the structure 902 which are positioned in a vertical plane.

In an alternative embodiment, an automatic re-orientation of the building block is allowed. For example, when analysing candidate positions in steps 510 and 511 of FIG. 5, different rotations of the new building block may be considered as additional candidate positions and analysed according to the implemented rating and subsequent connectivity verification. For example, when the new building block is to be connected to a hinge at some arbitrary angle, it is not necessary for the user to perfectly align the new building block to the axis of the hinge. The process will evaluate rotated positions and connect the new building block after a rotation. In some embodiments, the automatic re-orientation is limited to a predetermined space angle, e.g. 45 degrees, 30 degrees, or the like, thereby avoiding large rotations which may confuse the user and lead to unintended results.

It is another advantage of the process described above that the user receives a clear indication as to where the new building block will be placed and connected. Furthermore, small corrections of the 2D position of the new building block on the screen as controlled by the user are immediately taken into account, thereby providing an impression of a smooth and natural workflow.

It is understood, that a skilled person may, within the scope of the invention, implement variations of the above method. For example, the order of some of the above steps may be changed, steps may be combined, etc.

For example, after having placed the new building block in a 3D scene, a user may activate a search tool for searching similar positions. In one embodiment, the search tool may allow the user to step through the positions of the ordered list 520 of FIG. 5, thereby allowing the user to select one of the possible positions.

The term 'manipulating' a digital representation of an object is intended to refer to any user-controlled manipulation of the digital representation, e.g. the connection of a new building block, the moving of an existing building block from one position to another, or any other operation changing the position of a building block in a 3D scene.

The invention claimed is:

1. A computer-implemented method of manipulating a three-dimensional virtual building block model by means of two-dimensional cursor movements, the virtual building block model including a plurality of virtual building blocks each including a number of connection elements for connecting the virtual building block with another virtual building block according to a set of connection rules indicating whether said virtual building block is connectable with a connection element of said another virtual building block, the method comprising providing a digital representation of a structure comprising a number of said virtual building blocks in a three-dimensional coordinate system;

positioning, by means of cursor movements in a two-dimensional computer display area representing a projection of said structure, a two-dimensional projection of a first virtual building, block, to be connected to the structure, resulting in two-dimensional position coordinates;

determining, from the two-dimensional position coordinates, a number of three-dimensional candidate positions of the first virtual building block in the three-dimensional coordinate system, each of the candidate positions being, consistent with the two-dimensional position coordinates of the aforementioned step;

selecting one of said candidate positions based on the connection rules and a predetermined set of position rating rules, wherein the position rating rules result in respective ratings of said candidate positions and selection comprises selecting a candidate position having a highest rating;

connecting the first building block to said structure at the selected candidate position;

determining a number of candidate connection elements of said structure, each of the candidate connection elements having a projection in the two-dimensional display area within a redetermined neighborhood around a projection of a connection element of the first virtual building block;

selecting one of said candidate connection elements based on the connection rules and the predetermined set of position rating rules; and if a connection between the first virtual building block and said structure is valid according to the set of connection rules, connecting the first virtual building block with the structure via at least the selected candidate connection element.

2. A method according to claim 1, wherein the step of determining a number of three-dimensional candidate positions further comprises determining a number of candidate orientations of the first virtual building block in the three-dimensional coordinate system.

3. A method according to claim 1, wherein the step of selecting one of said candidate connection elements further comprises rating the candidate connection elements with respect to their distance from a virtual camera position.

4. A method according to claim 1, wherein the step of selecting one of said candidate connection elements further comprises discarding candidate connection elements that are not visible from the current virtual camera position.

5. A method according to claim 1, wherein the step of selecting one of said candidate connection elements further comprises rating the candidate connection elements with respect to the distance of their two-dimensional projections to the two-dimensional projection of the corresponding connection element of the first virtual building block.

6. A method according to claim 1, wherein the digital representation of said structure comprises, for each virtual building block, a number of regular grids corresponding to at least one of the surfaces of the virtual building block, each regular grid comprising a number of grid points, each grid point representing a connection element.

7. A method according to claim 6, and wherein said predetermined neighborhood around a projection of a connection element of the first, virtual building block has a diameter corresponding to the distance between neighboring grid points of the corresponding, regular grid.

8. A method according to claim 1, wherein the step of determining the number of candidate positions further comprises rotating the first building block to obtain candidate positions of a rotated building block.

9. A method according to claim 8, wherein the rotation of the first building block is limited to a predetermined space angle around a user-selected orientation.

10. A method according to claim 1, further comprising receiving a user command controlling a user-selected orientation of the first virtual building block.

11. A method according to claim 10, wherein the user-selected orientation is limited to one of a set of discrete orientations.

12. A method according to claim 1, wherein the two-dimensional projection is a parallel projection.

13. A data processing system comprising a memory having stored thereon a computer program comprising program code means for performing all the steps of claim 1, when said program is run on tile data processing system.

14. A memory comprising program code means for performing all the steps of claim 1, when said program is run on a computer.

* * * * *